(12) United States Patent
Todd

(10) Patent No.: US 12,005,653 B2
(45) Date of Patent: Jun. 11, 2024

(54) CONTAINER COMPRISING FIBRE MATERIAL FOR A FIBRE-REINFORCED COMPOSITE COMPONENT

(71) Applicant: BLADE DYNAMICS LIMITED, Eastleigh (GB)

(72) Inventor: Paul Todd, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 0 days.

(21) Appl. No.: 17/760,592

(22) PCT Filed: Sep. 15, 2020

(86) PCT No.: PCT/EP2020/075759
§ 371 (c)(1),
(2) Date: Mar. 15, 2022

(87) PCT Pub. No.: WO2021/052956
PCT Pub. Date: Mar. 25, 2021

(65) Prior Publication Data
US 2022/0339890 A1    Oct. 27, 2022

(30) Foreign Application Priority Data
Sep. 16, 2019  (GB) ..................... 1913332

(51) Int. Cl.
*B29C 70/34* (2006.01)
*B29C 70/54* (2006.01)
(Continued)

(52) U.S. Cl.
CPC ............ *B29C 70/342* (2013.01); *B29C 70/54* (2013.01); *B29K 2307/04* (2013.01); *B29K 2309/08* (2013.01); *B29L 2031/085* (2013.01)

(58) Field of Classification Search
CPC ................................... B29C 70/342
See application file for complete search history.

(56) References Cited

U.S. PATENT DOCUMENTS

| 6,991,449 B1 | 1/2006 | Mead et al. |
| 9,056,413 B1 | 6/2015 | Cox et al. |
| 2014/0175709 A1* | 6/2014 | Blackburn .............. B29B 11/16 264/554 |

FOREIGN PATENT DOCUMENTS

| KR | 20130105015 A | 9/2013 |
| WO | 2011081724 A1 | 7/2011 |

(Continued)

Primary Examiner — Jeffry H Aftergut
(74) Attorney, Agent, or Firm — Nath, Goldberg & Meyer; Jerald L. Meyer

(57) ABSTRACT

The present invention relates to a container having a cavity, wherein the cavity has a cavity pressure and comprises fibre material suitable for manufacturing one or more fibre-reinforced composite components for a wind turbine blade, and at least a part of the fibre material touches a first part of a wall of the container, at least the first part of the wall consisting of a flexible airtight material, and a ratio of an entire volume of non-cured polymer in the cavity to an entire volume of the fibre material in the cavity is less than 0.3, and the container is adapted to prevent inflow of a polymer into the cavity. A method for preparing such a container is also disclosed. A method for laying fibre material into a mould is also disclosed.

20 Claims, 14 Drawing Sheets

(51) Int. Cl.
*B29K 307/04* (2006.01)
*B29K 309/08* (2006.01)
*B29L 31/08* (2006.01)

(56) References Cited

FOREIGN PATENT DOCUMENTS

| | | | |
|---|---|---|---|
| WO | 2011081726 | A1 | 7/2011 |
| WO | 2012035105 | A1 | 3/2012 |
| WO | 2018146178 | A1 | 8/2018 |
| WO | WO-2018/146178 | A1 * | 8/2018 |

* cited by examiner

CONTAINER COMPRISING FIBRE MATERIAL FOR A FIBRE-REINFORCED COMPOSITE COMPONENT

This is a National Phase Application filed under 35 U.S.C. 371 as a national stage of PCT/EP2020/075759, filed Sep. 15, 2020, an application claiming the benefit of British Patent Application No. 1913332.1, filed Sep. 16, 2019, the content of each of which is hereby incorporated by reference in its entirety.

TECHNICAL FIELD

The present invention relates to laying up and moving fibre materials, such as glass fibre and carbon fibre materials, for instance for use in manufacturing wind turbine blades.

BACKGROUND

Manufacturing of a shell of a wind turbine blade in a fibre-reinforced composite material is time consuming, whether the manufacturing steps involve dry fibre that is later infused with a polymer, or pre-impregnated fibre material. In the case of dry fibres, the layup process is performed on a mould in such a way as to achieve the desired shape, including the desired cross-sectional properties along the longitudinal axis of the blade. In some cases, a blade may include a "main laminate" or spar cap, a locally thicker structure that adds load-bearing strength to the blade. Some areas of the blade might include a combination of different fibre types, such as a very specifically layered structure that includes e.g. glass fibre mats and/or carbon fibre mats. However, it is a cumbersome process with certain downsides. For instance, in some manufacturing processes, a large fraction of the shell is laid up using dry fibre and the infusion of polymer into the fibres is performed only after the layup process has been entirely completed. This may have an adverse effect on the turnaround time.

It is an object of the invention to provide a method for assisting in laying up dry fibre material or nearly dry fibre material in the manufacture of a fibre-reinforced composite component. A container for such a process is also provided, as well as a method for providing such a container.

SUMMARY OF THE INVENTION

In a first aspect, the invention provides a container having a cavity. The cavity has a cavity pressure and comprises fibre material suitable for manufacturing one or more fibre-reinforced composite components for a wind turbine blade and optionally a non-cured polymer, and at least a part of the fibre material touches a first part of a wall of the container, at least the first part of the wall consisting of a flexible airtight material, and a ratio of an entire volume of non-cured polymer in the cavity to an entire volume of the fibre material in the cavity is less than 0.3, and the container is adapted to prevent inflow of a polymer into the cavity.

Such a container allows personnel to provide a fibre material layup arranged with a certain shape and a certain combination of fibre material elements, such as fibre mats. The layup can even be performed in a location remote from a mould in which the actual manufacturing the fibre-reinforced composite component is to take place. In other words, part of the layup process may proceed without having access to the mould. Subsequently, the container containing the laid-up fibre material is transported to the mould, where it is readily transferred to the mould, already arranged as required. The container being adapted to prevent inflow of polymer into the cavity (in other words, the container being impermeable to polymer) prevents polymer from entering the cavity unintentionally up until the time when the fibre material is to be transferred to the mould. Even a small amount of unwanted polymer can potentially cause problems during the subsequent infusion process, for instance by impeding flow of polymer during infusion.

In some embodiments, the cavity pressure is maintained below a threshold pressure of 800 hPa, such as below a threshold pressure of 500 hPa, such as below a threshold pressure of 200 hPa, such as below a threshold pressure of 100 hPa, such as below a threshold pressure of 50 hPa. In some embodiments, the cavity is passively sealed off to maintain the pressure below the threshold pressure. That is, the container is impermeable not only to liquid polymer, but also to air. In some embodiments, a valve is arranged in the container wall, and air can be removed from the cavity through the valve using a vacuum pump; the valve also prevents backflow of air into the cavity. Other equivalent means of sealing off the cavity to make it impermeable to air may be used.

As another example, the container comprises evacuation means in fluid communication with the cavity, the cavity evacuation means being configured to maintain the pressure in the cavity below the threshold pressure. The evacuation means may optionally also be used to reduce the pressure from an ambient pressure surrounding the container to a pressure below the threshold pressure.

An advantage of using a reduced pressure in the cavity is that it will further help maintain the fibre material in the cavity in place, preserving the shaped in which the fibre material was laid up. This allows the container to be moved or rotated without disturbing the layup. A threshold pressure adapted to maintain a shape of the fibre material in the cavity is preferable in many use cases.

In some embodiments, a ratio of an entire volume of both cured polymer and non-cured polymer in the cavity to the entire volume of the fibre material in the cavity is less than 0.3, such as less than 0.2, such as less than 0.1, such as less than 0.05.

In some embodiments, the cavity is empty of (i.e. does not contain) cured polymer and is empty of (i.e. does not contain) non-cured polymer. In other words, the fibre material is dry and the container does not contain prefabricated composite components.

In some embodiments, the ratio of the entire volume of non-cured polymer in the cavity to the entire volume of the fibre material in the cavity is less than 0.2, such as less than 0.1, such as less than 0.05. In some embodiments, the cavity is empty of (i.e. does not contain) non-cured polymer. In other words, the fibre material is entirely dry.

The fibre material may for instance comprise glass fibre and/or carbon fibre. The fibre may for instance be weaved, unidirectional, multidirectional, or non-weaved. Material other than glass fibre and carbon fibre may also be included in the cavity, if required as part of the fibre-reinforced component to be manufactured.

In some embodiments, the fibre material is arranged on a non-planar preform in the cavity. This allows the fibre material to have a non-planar shape at a side of the fibre material facing the preform. In such embodiments, the fibre material is stored supported by the preform. This allows the fibre material to maintain the intended shape.

In some embodiments, the fibre material comprises a plurality of fibre mats, such as fibre mats arranged in layers, overlapping or partly overlapping each other. The fibre material may also comprise one or more prefabricated fibre-reinforced composite elements.

In some embodiments, the flexible airtight material is made of a thermoplastic material, polyamide, polyethylene, or a nylon material. The flexible airtight material may optionally be shaped as a film, i.e. a relatively thin sheet. Alternatively or additionally, the flexible airtight material is suitable for use as a vacuum bagging material in a vacuum-assisted resin transfer moulding process for manufacturing a fibre-reinforced composite component.

Preferably, a static coefficient of friction of the flexible airtight material is less than 0.3, such as less than 0.25, such as less than 0.2, such as less than 0.15, such as less than 0.1. The static coefficient of friction may for instance be measured in accordance with the methods of the ASTM standard D 1894.

In a second aspect, the invention provides a method for providing a container comprising fibre material suitable for manufacturing one or more fibre-reinforced composite components for a wind turbine blade, such as by a vacuum-assisted resin transfer moulding process. The method comprises:
  arranging the fibre material on a layup surface having a layup surface shape, and optionally providing a non-cured polymer,
  forming a cavity by arranging a flexible airtight material in contact with the layup surface, the cavity surrounding the arranged fibre material and the non-cured polymer, a ratio of an entire volume of non-cured polymer in the cavity to an entire volume of fibre material in the cavity being less than 0.3, and
  sealing off the cavity so as to prevent inflow of polymer into the cavity.

In some embodiments, the seal is maintained by virtue of a reduced pressure in the cavity that causes the flexible airtight material to sealably collapse against the layup surface. Sealant tape may also be used in the sealing process. The sealing makes the container impermeable to polymer.

The person skilled in the art will readily recognize that the considerations that apply to embodiments of the first aspect of the invention may also apply to embodiments of the second aspect. For instance, the pressure in the cavity may be reduced to a pressure below a threshold pressure of 800 hPa, such as below a threshold pressure of 500 hPa, etc. Similarly, the flexible airtight material may be a vacuum bagging material; the fibre material may comprise glass fibre; and so on. Thus, for the purpose of brevity, all those considerations will not be repeated in relation to the second aspect of the invention, but shall be considered to apply to the extent they are compatible with the second aspect.

In a third aspect, the invention provides a method for laying up fibre material in a mould having a mould surface. The method comprises:
  providing a container in accordance with an embodiment of the first aspect,
  arranging the container on the mould surface and/or on material prearranged on the mould surface, wherein the container is arranged such that the first part of the wall of the container is supported by the mould surface and/or by the prearranged material, and the fibre material is supported at least partly by the first part of the wall of the container,
  allowing the cavity pressure to assume an ambient pressure surrounding the container, and
  removing at least a part of the flexible airtight material from between the fibre material and the mould surface and/or the prearranged material, the removing being performed while at least part of the fibre material continues to be supported at least partly by the first part of the wall.

Embodiments of this method allows personnel to readily transfer fibre material already arranged in a complex layup into a mould, specifically by using a container in accordance with an embodiment of the first aspect of the invention. An advantage is that the layup can be prearranged elsewhere, i.e. not directly in the mould, with the required shape and/or combination of fibre material elements such as fibre mats. Thus, part of the layup process for a fibre-reinforced composite element to be manufactured may proceed without access to the mould. Once the container is available at the mould site, the fibre material can readily be transferred into the mould, as laid up.

If there is no prearranged material in the mould ahead of performing steps pertaining to embodiments of the third aspect of the invention, the first part of the wall of the container is necessarily supported directly by the mould surface.

In some embodiments, the fibre material, prior to initiating removing the at least a part of the flexible airtight material, is supported only by the first part of the wall of the container. When the first part of the wall is made of a flexible airtight material that has a low static coefficient of friction, the removal of the flexible airtight material from under the fibre material is easier to achieve if a large part of the fibre material in the cavity rests on the low friction material.

In some embodiments, material suitable for use as a vacuum bagging material in a vacuum-assisted resin transfer moulding process for manufacturing a fibre-reinforced composite component is used as the flexible airtight material. Vacuum bagging materials are usually slippery and strong and can therefore be advantageous in embodiments of the third aspect for those reasons.

In some embodiments, the step of allowing the cavity pressure to assume the ambient pressure surrounding the container is initiated after initiating the step of arranging the container on the mould surface and/or on the prearranged material. In some embodiments, the step of allowing the cavity pressure to assume the ambient pressure is performed after the step of arranging the container has been completed.

Note that in some embodiments and in some use cases, the cavity pressure may already be at ambient pressure. Thus, the step of allowing the cavity pressure to assume the ambient pressure requires no action, as the cavity pressure has already been allowed to assume the ambient pressure.

In some embodiments, the step of removing at least a part of the flexible airtight material comprises sliding the flexible airtight material out from between the fibre material and the mould surface and/or the prearranged material. As disclosed above, the removal of the flexible airtight material from under the fibre material is easier to achieve when the flexible airtight material has a low static coefficient of friction, such as 0.3 or less, such as 0.2 or less, such as 0.1 or less.

In some embodiments, removing at least a part of the flexible airtight material comprises rolling the flexible airtight material onto a roller between the fibre material and the mould surface and/or the prearranged material. By using a roller having a relatively small diameter, such as at most 20% of a highest thickness of the laid-up fibre material, the layup is disturbed very little during removal of the flexible airtight material using the roller. For instance, if the layup has a substantially uniform thickness of 5 cm across the layup, a roller having a diameter of 1 cm will cause little disturbance of the layup. In some embodiments, a roller having a diameter of at most 30% of the highest thickness of the laid-up fibre material may still provide sufficiently little disturbance to the layup.

In some embodiments, the mould is a mould for a wind turbine blade part.

The person skilled in the art will readily recognize that the considerations that apply to embodiments of the first and the second aspects of the invention may also apply to embodiments of the third aspect, some of which have already been disclosed in detail. For instance, the threshold pressure may be 50 hPa or 100 hPa etc. Similarly, the fibre material may comprise glass fibre, and so on. Thus, for the purpose of brevity, all those considerations will not be repeated in relation to the third aspect of the invention.

The person skilled in the art will readily recognize that it is possible to combine certain steps or perform certain steps in an at least partly concurrent manner in some embodiments of the second and/or the third aspect of the invention. The person skilled in the art will also readily recognize that for instance certain means and materials described above may be substituted by other means or materials that provide substantially the same function or provide substantially the same effect. This includes equivalent means and materials.

BRIEF DESCRIPTION OF THE DRAWINGS

The invention is explained in detail below by way of example with reference to the drawings.

DETAILED DESCRIPTION OF THE INVENTION

Figure 1:
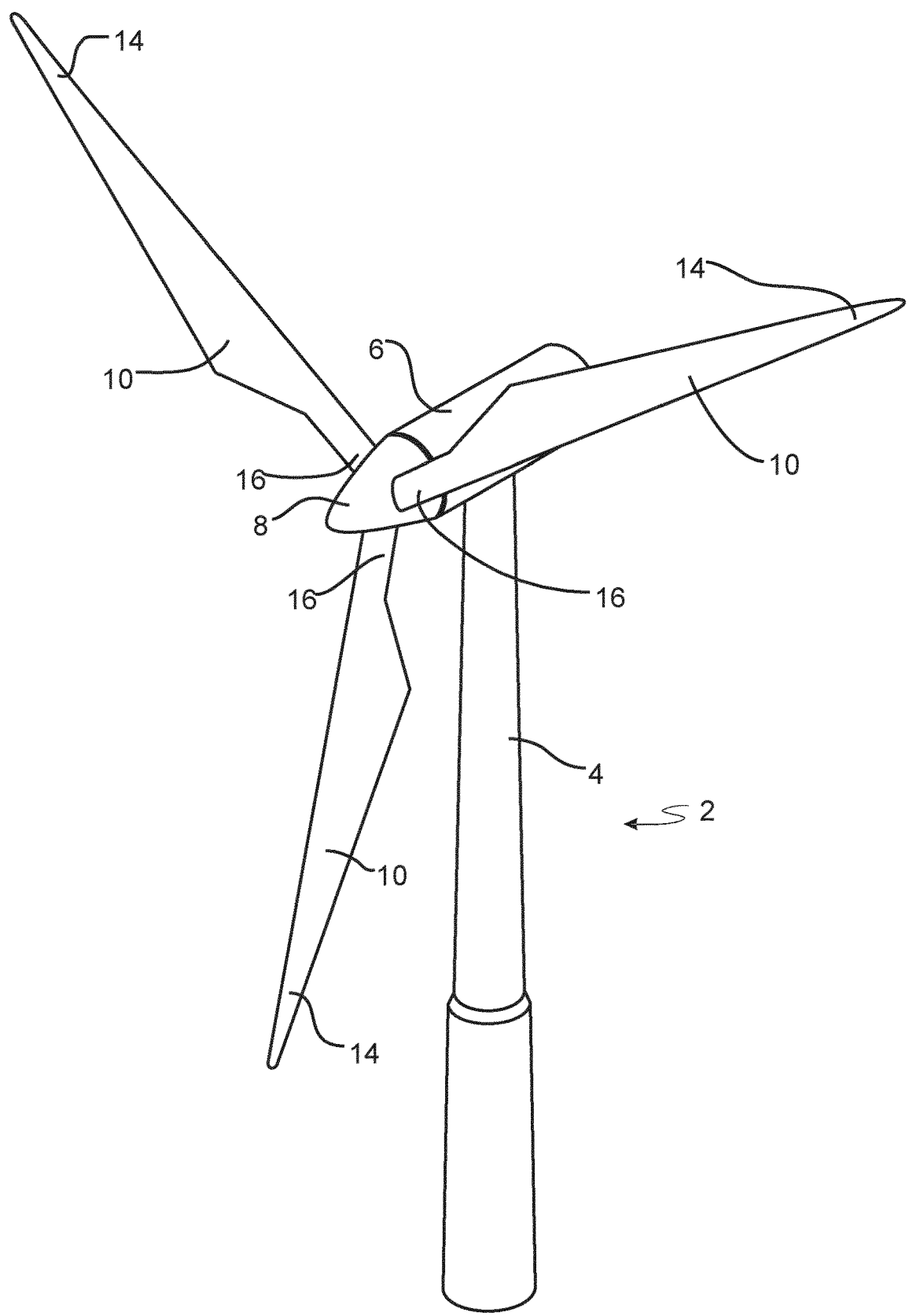
FIG. 1 shows a schematic view of a wind turbine having three wind turbine blades.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a root end 16 nearest the hub and a blade tip 14 furthest from the hub 8.

Figure 2:
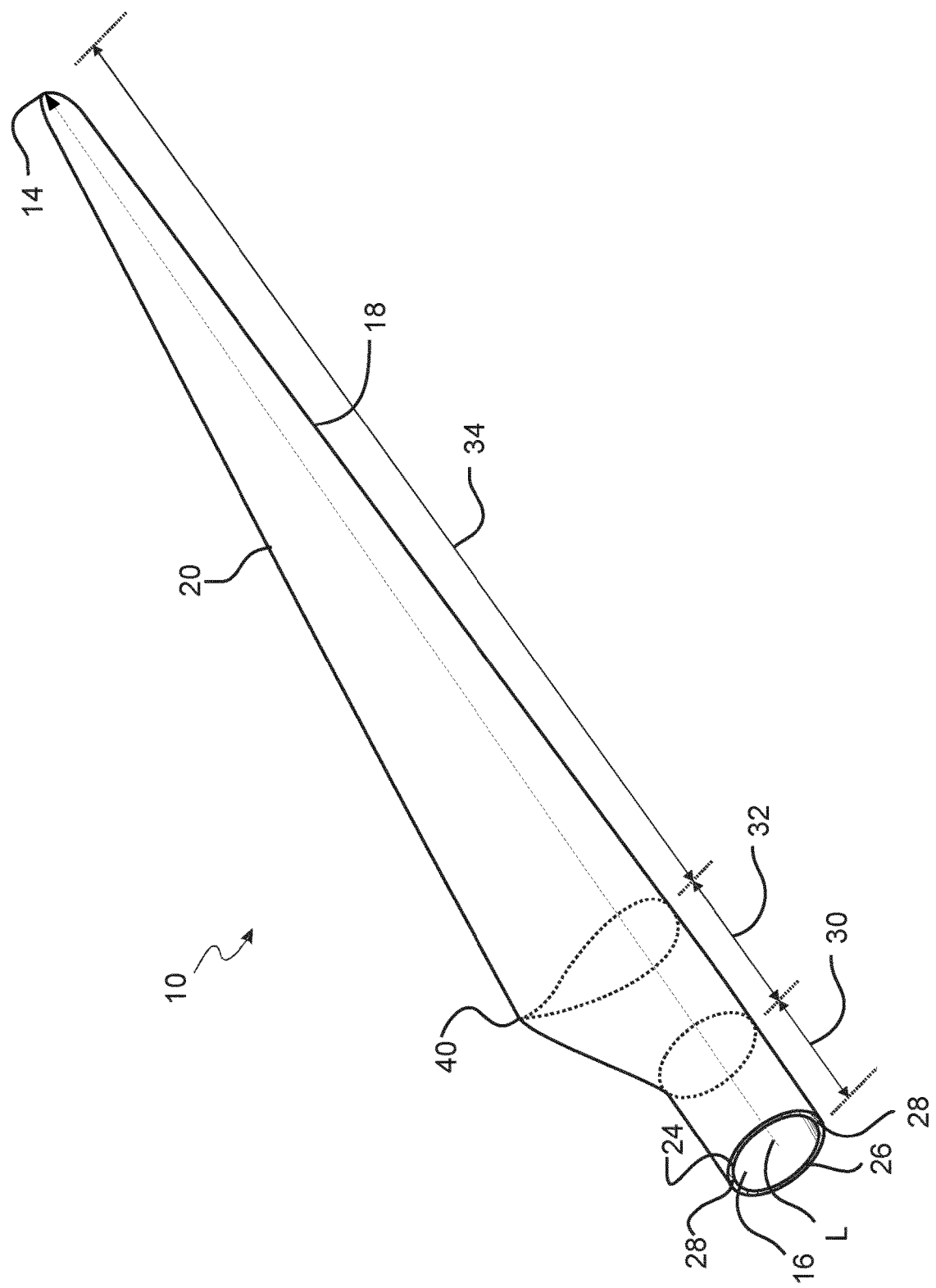
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or airfoil region 34 furthest away from the hub 8, and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The airfoil region 34, also called the profiled region, has an ideal or almost ideal blade shape with respect to generating lift, whereas the root region 30 due to structural considerations has a substantially circular or elliptical cross-section, which for instance makes it easier and safer to mount the blade 10 to the hub 8. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord in the airfoil region 34 typically decreases with increasing distance r from the hub. A shoulder 40 of the blade 10 is defined as the position, where the blade 10 has its largest chord length. The shoulder 40 is typically provided at the boundary between the transition region 32 and the airfoil region 34.

The wind turbine blade 10 comprises a blade shell comprising two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part 26 are attached to one another with adhesive, such as glue, along bond lines or glue joints 28 extending along the trailing edge 20 and the leading edge 18 of the blade 10. Typically, the root ends of the blade shell parts 24, 26 have a semi-circular or semi-oval outer cross-sectional shape.

Figure 3:
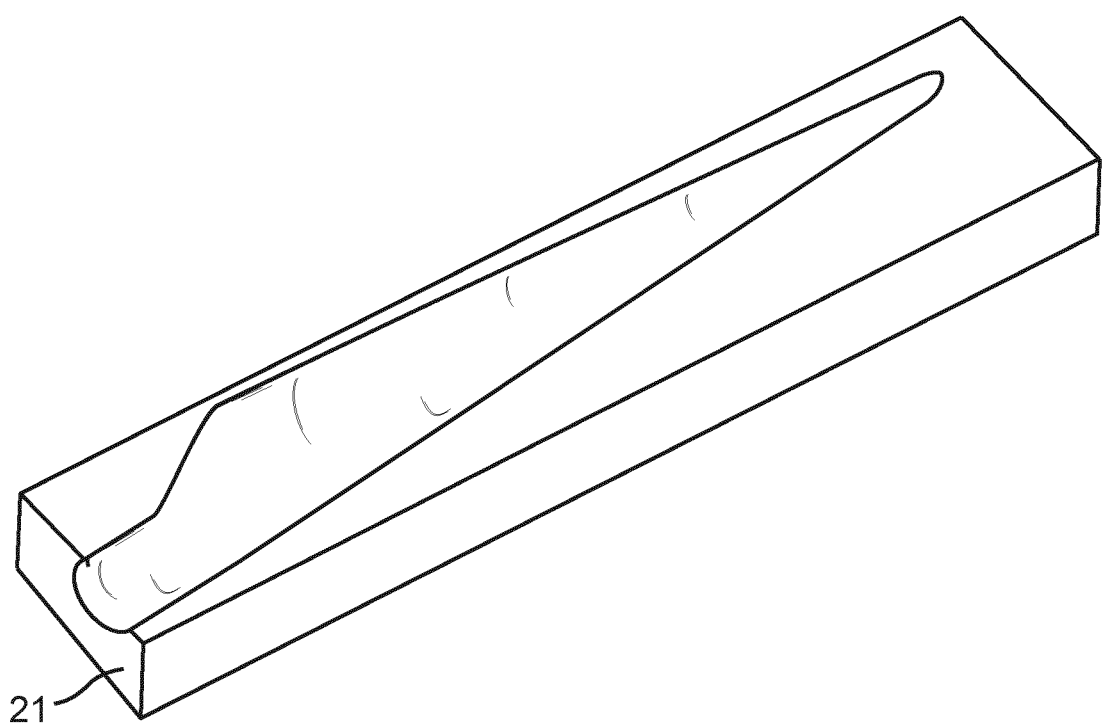
FIG. 3 is a schematic diagram illustrating an exemplary mould for a wind turbine blade shell part.

FIG. 3 illustrates a mould for manufacturing a wind turbine blade shell part. The aerodynamic shell parts are often made by use of Vacuum Assisted Resin Transfer Moulding (VARTM), where a plurality of e.g. glass fibre and/or carbon fibre mats, and in some cases other materials, are arranged on a mould. When these materials have been stacked so as to form the final shape of the wind turbine blade shell part, a flexible vacuum bag is arranged on top of the fibre mats and sealed against the rigid mould part, thereby forming a mould cavity containing the fibre mats. Resin inlets and vacuum outlets are connected to the mould cavity in preparation for a process known as infusion. These allow resin to be introduced into the mould cavity. When using dry fibre in the layup process, resin must be provided to impregnate the fibre materials in the mould cavity. Therefore, it is essential that resin can be provided into the mould cavity. The mould cavity is evacuated via the vacuum outlets, which forms an underpressure (also known as a negative pressure), such as for instance 5-10% of standard pressure, 101.325 kPa, preferably lower, in the mould cavity, after which a supply of liquid resin is provided via the resin inlets. The resin is forced into the mould cavity at least due to the pressure differential created by the evacuation. Here, the resin disperses in different directions in the mould cavity due to the negative pressure, which drives the resin flow front(s) towards the vacuum outlets. In the mould cavity, the resin impregnates the fibre material.

When the fibre material has been fully impregnated, the resin is cured, resulting in a fibre-reinforced composite element such as a shell part for a wind turbine blade.

The terms polymer and resin are used interchangeably. Polymers may be in liquid form or cured form. The resin used in the VARTM process is a liquid polymer.

Figure 4A:
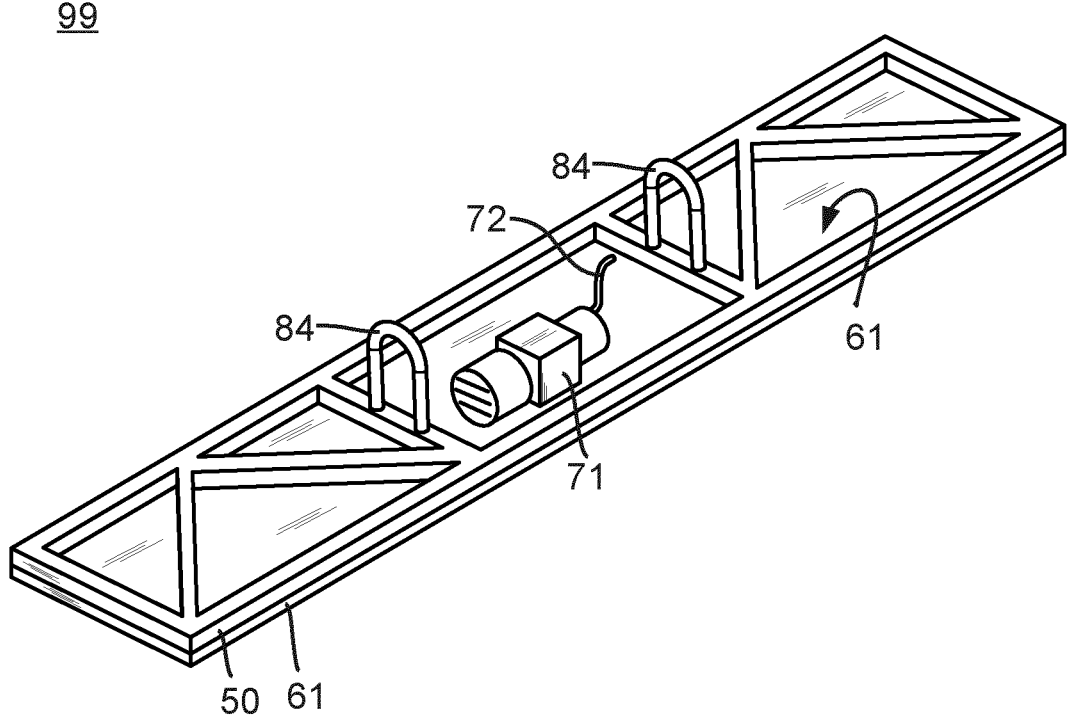
FIG. 4a-4e illustrates a method for laying up dry fibre material for a fibre-reinforced composite component.

FIG. 4a illustrates a device 99 that can be used in the present invention in the process of laying up fibre material in a desired manner. The device 99 has lifting means 84, in this case handles, that allow it to be lifted, for instance using a crane. The device 99 also has a vacuum pump 71 connected to a vacuum hose 72. The vacuum hose is in communication with the opposite side of the device 99. The device has a supporting frame structure 50 that adds strength to the device 99. In the present example, the device has a board 61 made of an airtight material, for instance rubber, steel, or a fibre-reinforced composite element.

Figure 4B:
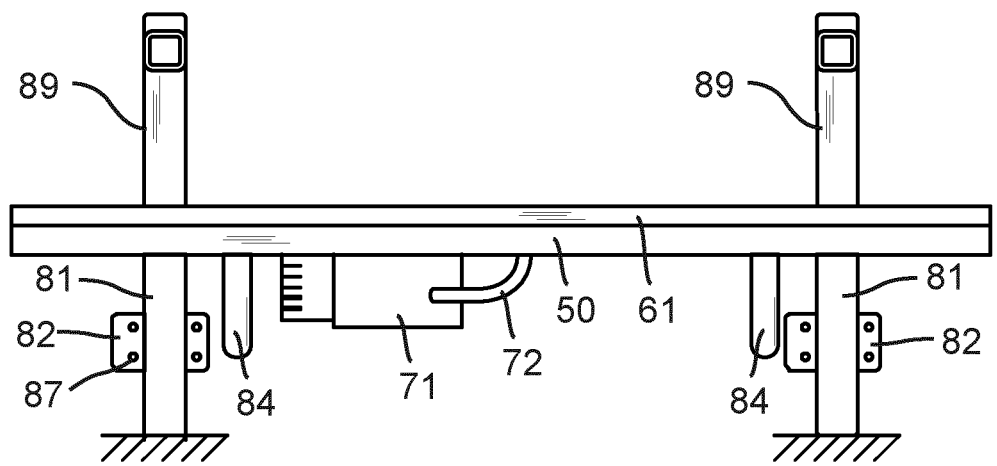

FIG. 4b illustrates schematically a side view of the device 99 (shown in FIG. 4a) attached to a turning ring arrangement having turning rings 81 with detachable legs 89. The turning rings are an example of a system that allows personnel to comfortably work at the device 99 and at the same time allows the laid-up fibre material to be transported for instance to a mould to be arranged therein. The turning ring 81 has detachable legs 89 that are attached to the rest of the turning ring via interface plates 82 connected using fastening means 87, such as nuts and bolts. The use of the turning ring arrangement is described in more detail in relation to FIGS. 5a-5f.

Figure 4C:
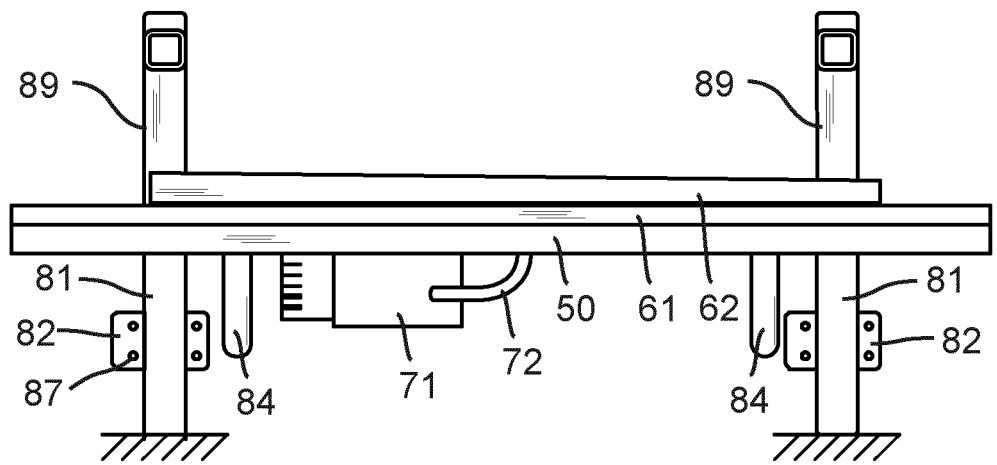

FIG. 4c shows the device with a preform 62 arranged on the board 61. In the present case, the board 61 itself has a flat surface in this example. To give the component to be manufactured a different shape, a preform having the desired shape is arranged on the board 61 as illustrated. In the present example, the preform 62 is necessary if the shape of the component to be manufactured does not have a flat surface. The use of a separate preform allows the shape to the fibre material to be changed by simply changing the preform.

Figure 4D:
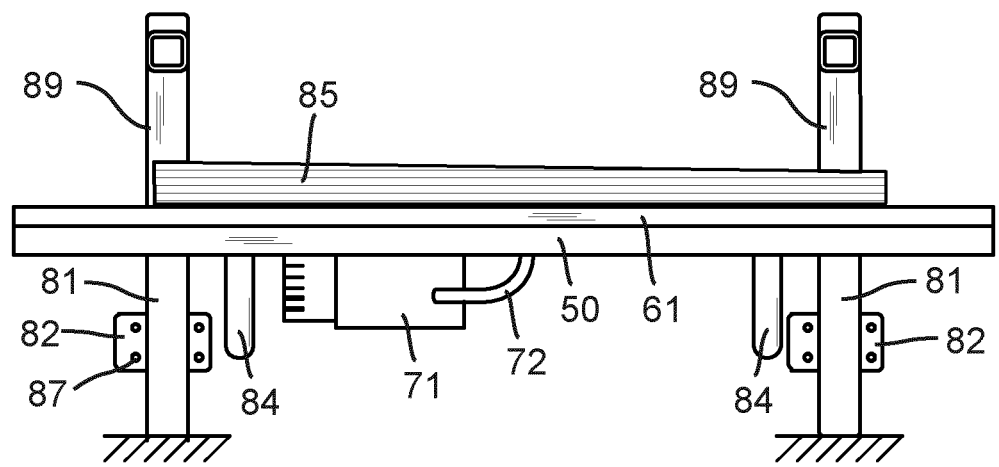

FIG. 4d schematically shows the preform 62 covered with dry fibre material 85 in a desired pattern, for instance fibre mats arranged in layers. Materials other than fibre material can also be added, if required. The shape of the upper surface of the laid-up fibre material is determined by the layup. For instance, if a uniformly thick component is to be manufactured, fibre material is laid up with a uniform thickness on the preform.

Figure 4E:
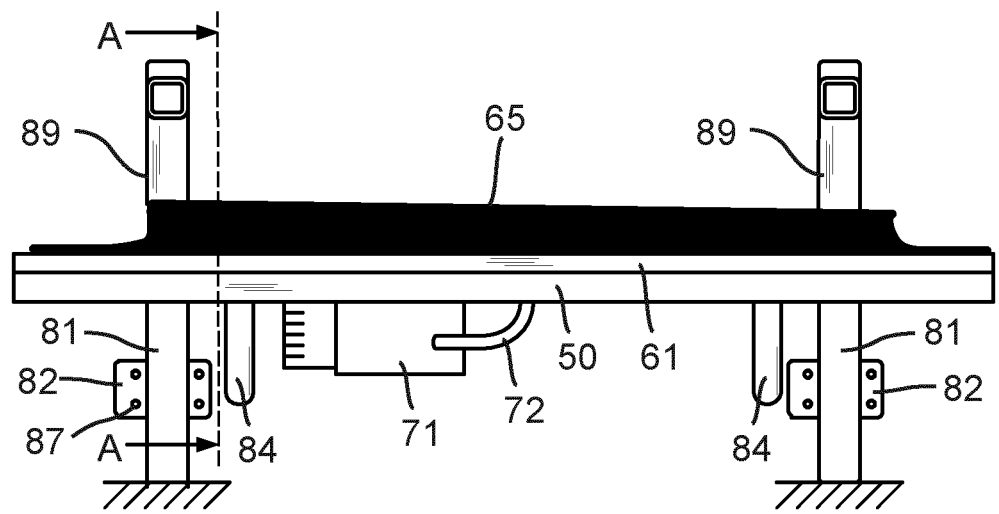

FIG. 4e illustrates a container 100 in accordance with an embodiment of the invention. An airtight flexible material 65 has been draped over the preform and the laid-up fibre material 85 shown in FIG. 4d. The airtight flexible material may for instance be a vacuum bagging material. The bag 65 is arranged to be in contact with the board 61, whereby the board 61 together with the bag 65 can form an airtight cavity containing the fibre material 85. The bag 65 may be attached to the board by means of a sealant material, such as a sealant tape. This can make removal of air from the cavity easier. After establishing an airtight cavity, suction is provided in order to reduce the pressure in the cavity. The reduction in pressure can cause the flexible airtight material to surround the fibre material components tightly and possibly compress the fibre material.

In the present example, air is removed through the vacuum hose 72 using the vacuum pump 71. The pressure may for instance be reduced to 200 hPa or lower. When the pressure is reduced significantly, the bag 65 attaches tightly to at least some of the fibre material. In this state, the fibre material 85 is held compressed between the preform 62 and the bag 65. The reduced pressure makes the layup very stable, in turn making it very difficult for different fibre material elements in the cavity to shift relative to one another, even if the container 100 is turned upside down or bumped.

At this point, the cavity can be sealed, whereby the reduced pressure can be maintained passively. The vacuum pump can alternatively remain attached and actively ensure that the pressure remains reduced.

An advantage of using a pressure low enough to maintain the layup stable is that the layup can be stored in the container for an extended period of time and/or be transported over long distances and under bumpy conditions without the layup being disturbed. This means that the container holding the layup can be prepared on a remote site and be transported to the site where the complete fibre-reinforced composite component is to be manufactured. As an example, a main laminate layup may be provided in accordance with the process described above and subsequently be transported to a wind turbine blade shell manufacturing site that implements the main laminate. The turning ring 81, 89 is optional; as is the vacuum pump once the container is passively sealed.

Using attachment means 84 illustrated for instance in FIGS. 4a-4e, the container containing the arranged fibre material components under reduced pressure can be lifted to the position, where the layup is to be used. This will be illustrated with reference to FIGS. 5a-5h below.

Figure 5A:
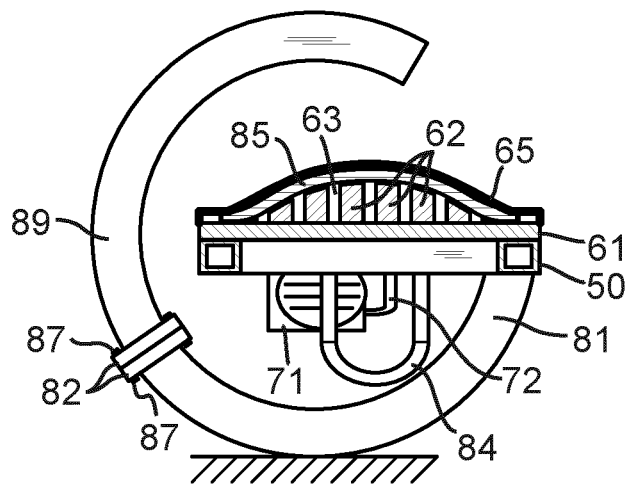
FIG. 5a-5h illustrates a method for arranging laid-up dry fibre material on a mould in a process of manufacturing a fibre-reinforced composite component.

FIG. 5a illustrates container 100 shown in FIG. 4e, in particular the cross-section A-A indicated in FIG. 4e. FIG. 5a shows the turning ring 81 with detachable legs 89. The preform 62 supporting the layup 85 can be seen. The flexible airtight material covers the layup and together with the board 61 forms a cavity that may have a reduced pressure, for instance a pressure below 200 hPa. The reduced pressure may for instance have been provided using the vacuum pump 71. The vacuum hose 72 communicates with the cavity to suck air out of the cavity. In order to allow for air to be removed and for the flexible airtight material 65 to collapse onto the layup, air channels 63, shown schematically, are provided as part of the preform 62. Optionally, the preform is made of or comprises perforated form, medium-density fibreboard with holes, glass fibre composite with holes, porous carbon fibre composite with holes, polystyrene with holes, and/or polyurethane with holes.

Figure 5B:
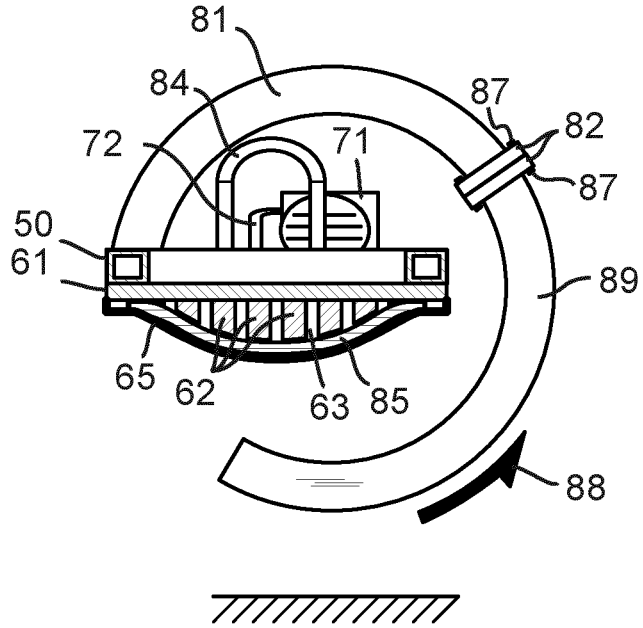

FIG. 5b illustrates the container 100 of FIG. 5a having been rotated as indicated by arrow 88 and lifted. The rotation can for instance be performed by rolling the turning ring. Then, the arrangement is lifted by attaching lift means (not shown) to the attachment means 84. The flexible airtight material 65 and layup 85 remain attached to the board 61 due to the reduced pressure, which prevents the flexible airtight material 65 from disengaging from the board 61.

Figure 5C:
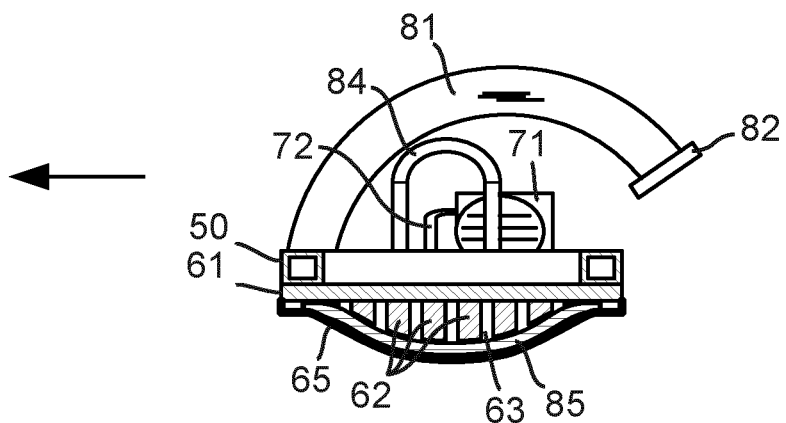

FIG. 5c illustrates the container 100 with the detachable legs 89 having been detached. As suggested by the arrow in FIG. 5c, the arrangement is then moved to the mould, which is necessary because the arrangement is prepared in a different location and not in the mould. The detachable legs 89 are removed in order to not interfere with the mould. This may or may not be necessary.

Figure 5D:
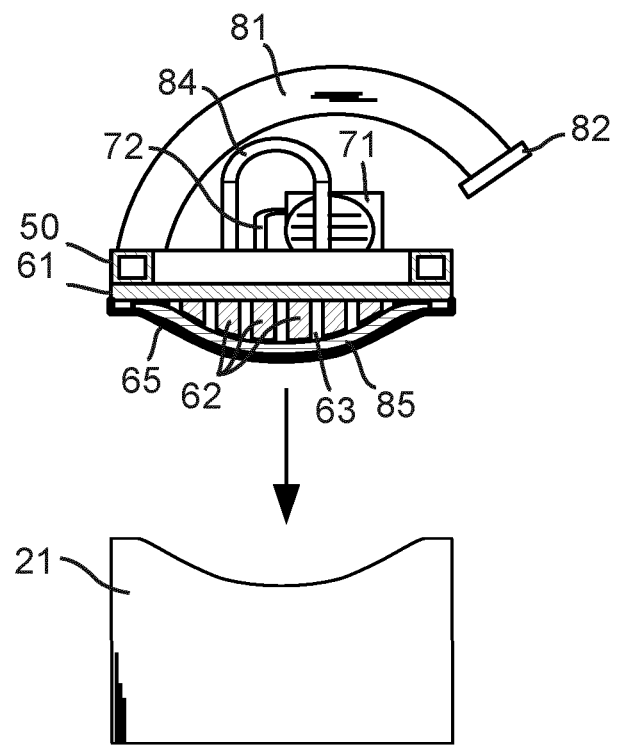

FIG. 5d illustrates the arrangement in FIG. 5c having been moved to a position above a mould 21 for moulding a fibre-reinforced composite component. As indicated by the arrow, the arrangement is lowered down onto the mould 21.

Figure 5E:
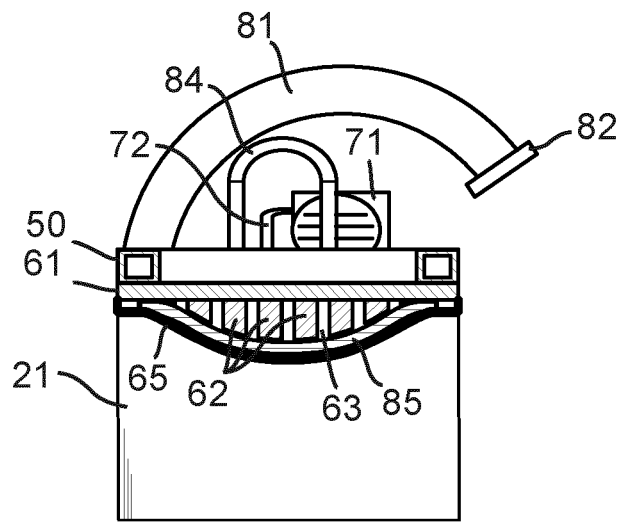

FIG. 5e illustrates the arrangement in contact with the mould surface (or material already placed in the mould, not shown). At this point, the pressure in the cavity is released, which allows the flexible airtight material 65 and layup 85 to release from the board 61, to rest on the mould 21. In case sealant tape was used to help making the cavity airtight, this is removed as well. It is important that the layup is lowered in such a way that when the layup comes to rest, the layup rests on the flexible airtight material, preferably entirely.

Figure 5F:
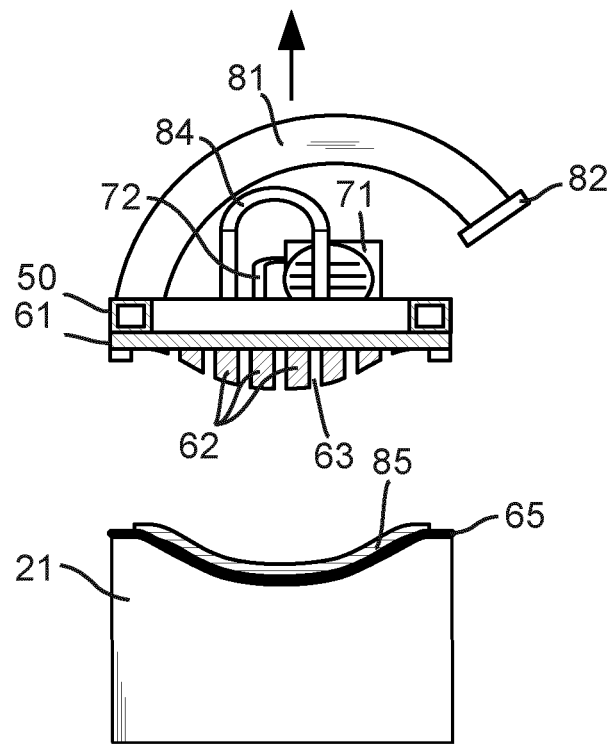

FIG. 5f illustrates the arrangement in FIG. 5e without the flexible airtight material 65 and layup 85, which have now been released onto the mould 21. The device 99 with turning ring 81 and preform 62 is lifted away from the mould after placement of the layup 85 and flexible airtight material 65.

Once the device 99 with turning ring 81 and preform 62 is out of the way, personnel can work around the mould 21 to continue preparation of the layup or prepare for the infusion process.

Figure 5G:
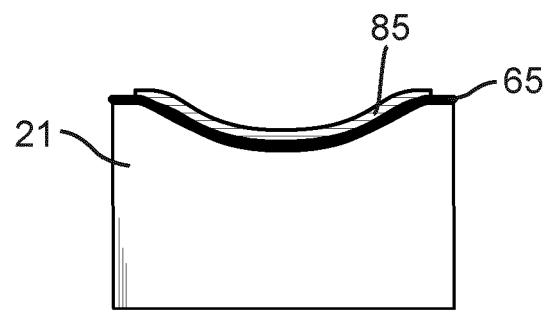

FIG. 5g illustrates the mould 21 after the device 99 with turning ring 81 and preform 62 being lifted away. The layup 85 now rests on the flexible airtight material 65. To finalize placing the layup on the mould, the flexible airtight material is removed from under that layup. The flexible airtight material is preferably made of a slippery material, such as slippery vacuum bagging material to make it easy to remove the flexible airtight material from under the fibre material 85.

Figure 5H:
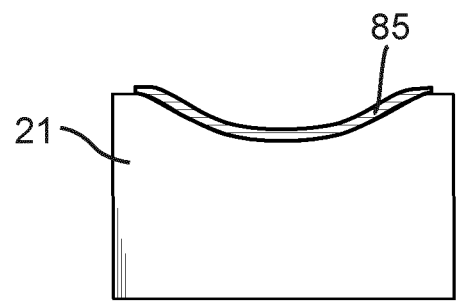

FIG. 5h illustrates the final result of the process. The laid-up fibre material is now arranged in the mould where the fibre-reinforced composite component is to be manufactured. Instead of having had to work around the mould, personnel have provided the layup in a different place, which has allowed other work to be carried out in the mould. Thus, the present method allows for a more parallelized manufacturing process.

FIGS. 6a-6g illustrates a process of removing the flexible airtight material 65 from under the fibre material after the device 99 with turning ring 81 and preform 62 have been removed, for instance as illustrated in FIG. 5f.

Figure 6A:
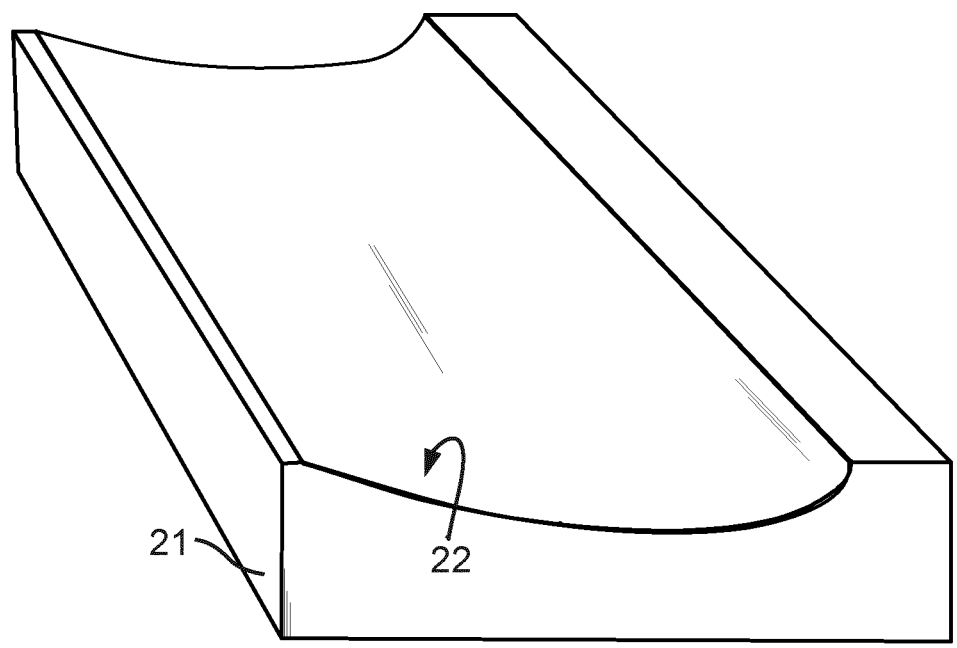
FIG. 6a-6g illustrates part of a method for arranging laid-up dry fibre material on a mould in a process of manufacturing a fibre-reinforced composite component.

FIG. 6a illustrates part of a mould 21 for a wind turbine blade shell. The mould has a mould surface 22. The mould part starts out empty in this example.

Figure 6B:
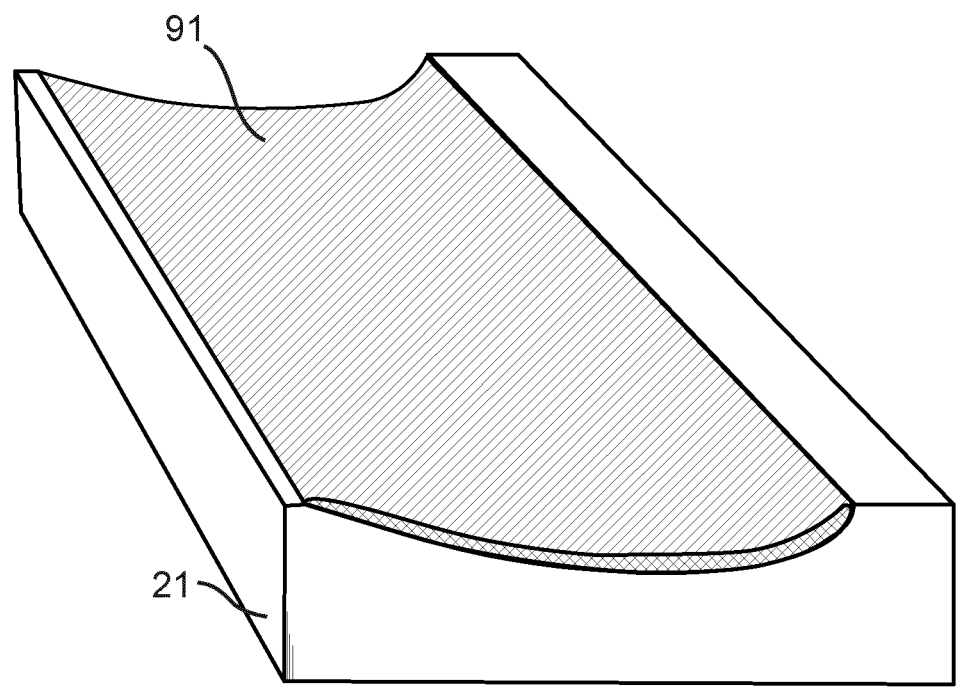

FIG. 6b illustrates material 91 already arranged on the mould surface 22. This work may for instance have been performed in the conventional way, where personnel has laid up material, such as by consecutively arranging fibre mats directly into the mould mat by mat, manually or semi-automatically. This may have been done concurrently with laying up other fibre material in the container 100 in accordance with the disclosure above. Alternatively, the method described above and further illustrated below may have been used to provide the prearranged material 91 onto the mould surface 22.

Figure 6C:
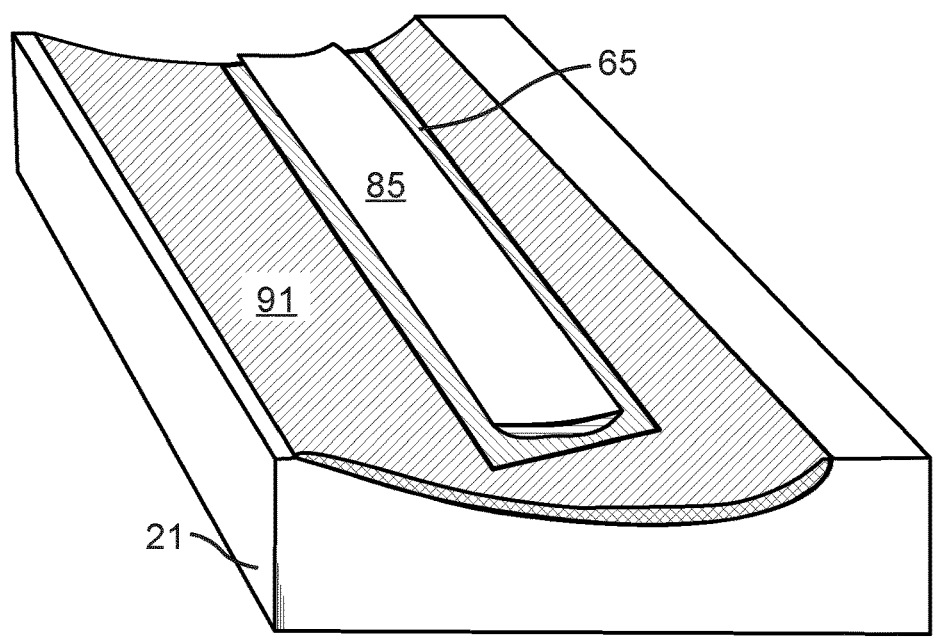

FIG. 6c illustrates a fibre material layup that has been placed on the prearranged material 91 using a method similar to the process illustrated in FIGS. 5a-5h. In FIG. 5g, the fibre material layup 85 initially rests on the flexible airtight material 65, which is in turn supported by the mould 21. In FIG. 6c, the flexible airtight material rests on the prearranged material 91 provided in advance.

Figure 6D:
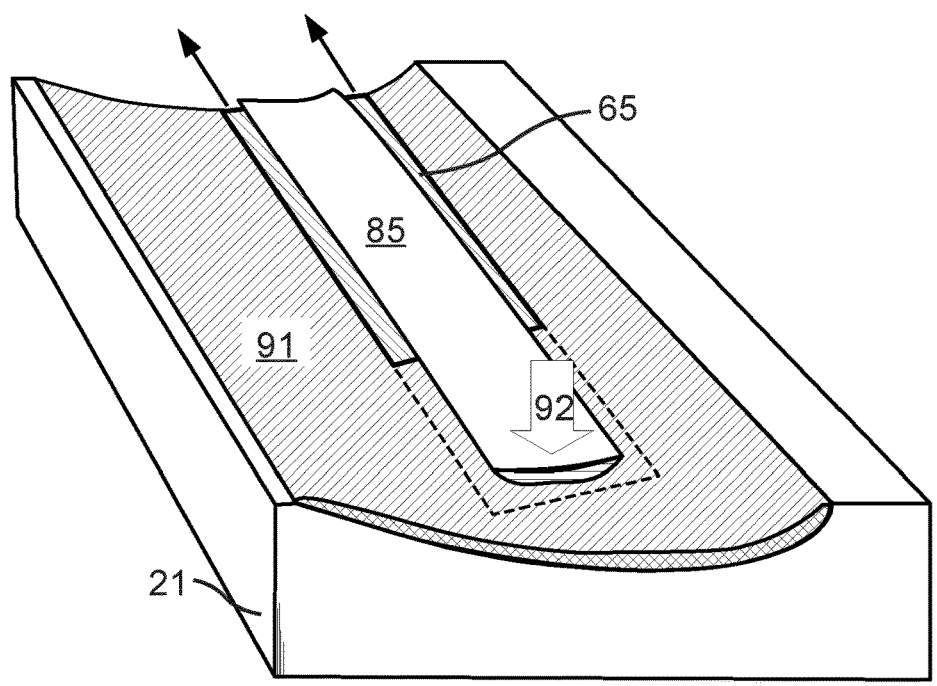

FIG. 6d illustrates a step of removing the flexible airtight material from under the fibre material layup 85. If necessary, the fibre material layup 85 may be held at one end while the preferably slippery flexible airtight material is pulled out from under the fibre material layup 85. Holding the fibre material layup can be supplemented or substituted by pressing down on the fibre material layup 85 as illustrated by arrow 92. Since the layup 85 initially may rest entirely on the flexible airtight material 65, pressing on the layup 85 at first may not initially be an option. However, once the flexible airtight material has been removed from under part of the layup, holding the layup in place by pressing down will be an option.

In FIGS. 6d-6g, the dashed lines illustrate where the flexible airtight material initially rested before being removed from between the fibre material 85 and the prearranged material 91.

Figure 6E:
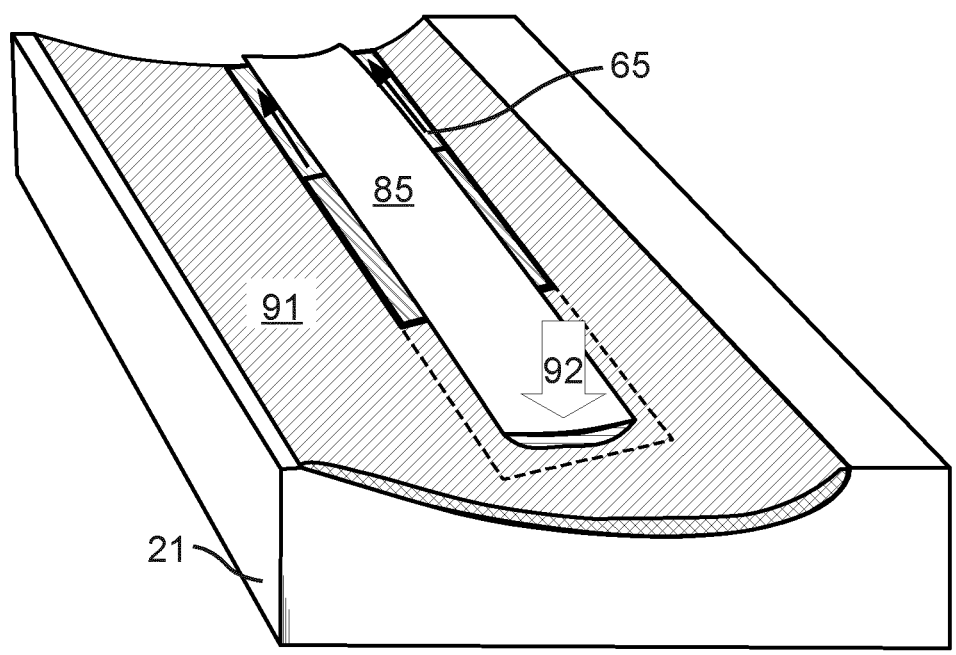

FIG. 6e illustrates removing the flexible airtight material 65 by folding the flexible airtight material 65 back onto itself. This has the advantage that the flexible airtight material experiences friction mostly on one side, specifically in contact with the fibre material layup 85, not with the underlying prearranged material 91. The other side of the flexible airtight material moves across the flexible airtight material 65 itself, which preferably is relatively slippery and thus creates little friction. Still, as described in relation to FIG. 6d, there may be a need to hold the fibre material layup 85 in place in order to avoid that the layup 85 simply moves together with the flexible airtight material 65.

Figure 6F:
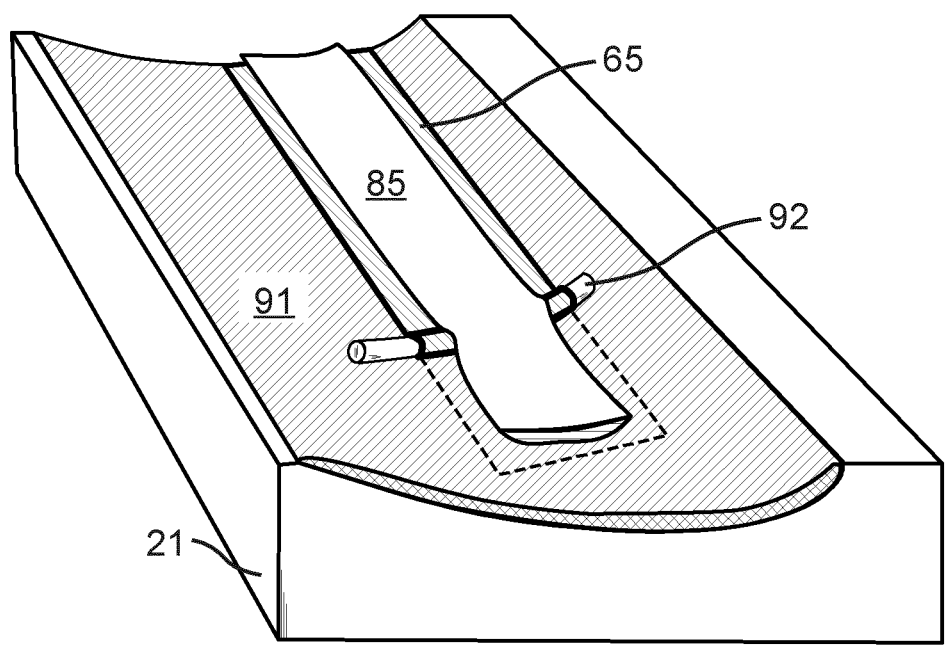

FIG. 6f illustrates another way of removing the flexible airtight material 65 from under the fibre material layup 85. The flexible airtight material is rolled onto a roller 92. In some embodiments, the roller comprises a slit for initially receiving and holding the flexible airtight material. This provides grip to allow the rolling of the flexible airtight material 65 onto the roller without the flexible airtight material 65 slipping on the roller. Another embodiment uses a roller having a sticky surface. Flexible airtight material 65 material that is not supporting fibre material from the layup can be stuck onto the sticky surface of the roller, and the rolling can be initiated. When the roller reaches the fibre material layup, the sticky surface of the roller is preferably already covered by the flexible airtight material 65 material that did not hold any fibre material. Referring back, FIG. 4e illustrates a flexible airtight material 65 that extends beyond the fibre material 85 shown in FIG. 4d. Once the flexible airtight material 65 and layup 85 is positioned on the mould, there will be flexible airtight material 65 material available for sticking onto such a sticky roller. Once the roller reaches the layup, it may be necessary to lift the fibre material layup 85 to allow the roller to get in between the fibre material layup 85 and the flexible airtight material 65. Once there, there will be little friction between the fibre material layup 85 and the roller, which at this point is covered with slippery flexible airtight material. If necessary, however, the fibre material layup 85 may additionally be held in place as described in relation to FIGS. 6d and 6e.

Figure 6G:
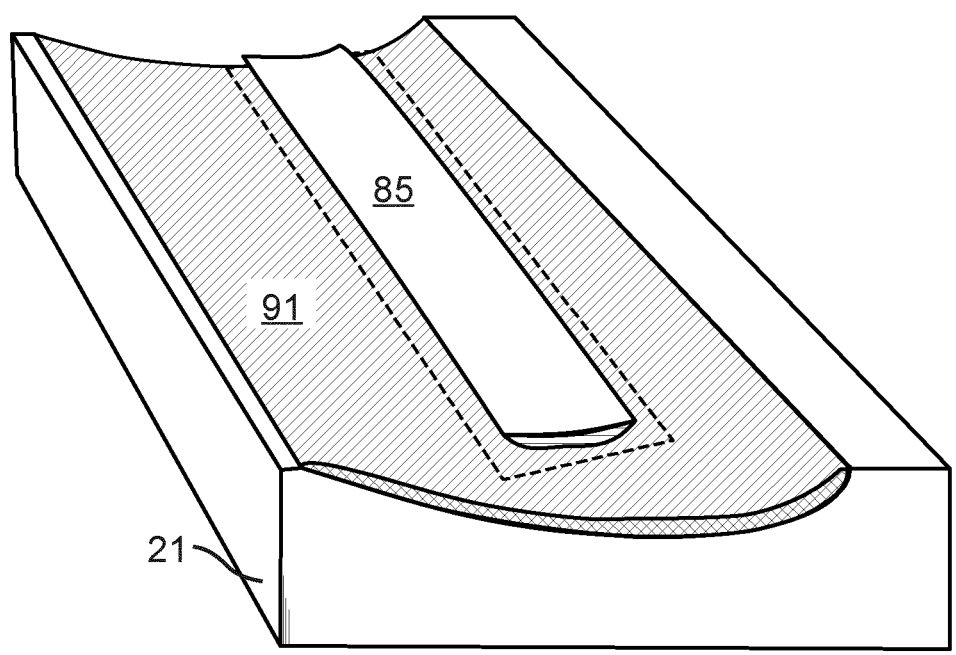

As shown in FIG. 6g, where the flexible airtight material 65 has been removed from under the fibre material layup 85, the fibre material layup now rests on the mould and is arranged substantially the way it was laid up in fibre material layup process step shown in FIG. 4d.

LIST OF REFERENCE NUMERALS

A-A cross-section of blade in airfoil region
L longitudinal axis of wind turbine blade
2 wind turbine
4 tower
6 nacelle
8 hub
10 wind turbine blade
11 first blade shell part (pressure side) in airfoil region
12 second blade shell part (suction side) in airfoil region
14 blade tip
16 root end
18 leading edge
20 trailing edge
21 mould
22 mould surface
24 first blade shell part (pressure side) at root end
26 second blade shell part (suction side) at root end
28 bond lines/glue joints
30 root region
32 transition region
34 airfoil region
40 shoulder
50 frame
61 flexible airtight material board 62 preform
63 preform air channel
65 flexible airtight material
71 vacuum pump
72 vacuum hose
81 turning ring
82 interface plate
84 attachment means
85 fibre material
87 turning ring fastening means
88 turn ring rotation
89 turning ring detachable legs
91 prearranged fibre material in mould
92 roller
99 device for fibre layup
100 container

The invention claimed is:

1. A method for providing a container comprising fibre material suitable for manufacturing one or more fibre-reinforced composite components for a wind turbine blade, the method comprising:
   selecting an interchangeable preform (62) with a desired shape for shaping the fibre material (85) to the desired shape;
   arranging the fibre material (85) on the interchangeable preform (62), the interchangeable preform (62) being supported on a board (61);
   forming a cavity by arranging a flexible airtight material (65) in contact with the board (61), the cavity surrounding the arranged fibre material (85) and the interchangeable preform (62); and
   sealing off the cavity so as to prevent inflow of polymer into the cavity.

2. The method in accordance with claim 1, further comprising:
   reducing a pressure in the cavity below a threshold pressure of 800 hPa.

3. The method in accordance with claim 1, further comprising a step of providing a non-cured polymer, wherein the cavity further surrounds the non-cured polymer, and wherein a ratio of an entire volume of the non-cured polymer in the cavity to an entire volume of the fibre material in the cavity is less than 0.3.

4. A method for laying up fibre material in a mould (21) having a mould surface (22), the method comprising:
   providing a container (100) having a cavity, wherein the cavity has a cavity pressure and comprises fibre material (85) suitable for manufacturing one or more fibre-reinforced composite components for a wind turbine blade, and at least a part of the fibre material (85) touches a first part (65) of a wall (61, 65) of the container, at least the first part (65) of the wall comprising a flexible airtight material (65), and the container is adapted to prevent inflow of a polymer into the cavity;
   arranging the container on the mould surface and/or on material prearranged (91) on the mould surface, wherein the container is arranged such that the first part of the wall of the container is supported by the mould surface and/or by the prearranged material, and the fibre material is supported at least partly by the first part of the wall of the container;
   allowing the cavity pressure to assume an ambient pressure surrounding the container; and
   removing at least a part of the flexible airtight material from between the fibre material and the mould surface and/or the prearranged material, the removing being performed while at least part of the fibre material continues to be supported at least partly by the first part of the wall of the container.

5. The method in accordance with claim 4, wherein the fibre material, prior to initiating removing the at least a part of the flexible airtight material, is supported only by the first part of the wall of the container.

6. The method in accordance with claim 4, wherein the step of allowing the cavity pressure to assume the ambient pressure surrounding the container is initiated after initiating the step of arranging the container on the mould surface and/or on the prearranged material.

7. The method in accordance with claim 4, wherein removing the at least a part of the flexible airtight material comprises sliding the flexible airtight material out from between the fibre material and the mould surface and/or the prearranged material.

8. The method in accordance with claim 4, wherein removing at least a part of the flexible airtight material comprises rolling the flexible airtight material onto a roller between the fibre material and the mould surface and/or the prearranged material.

9. The method in accordance with claim 4, wherein the mould (21) is a mould for a wind turbine blade part.

10. A container (100) having a cavity, wherein the cavity has a cavity pressure and comprises fibre material (85) suitable for manufacturing one or more fibre-reinforced composite components for a wind turbine blade, wherein at least a part of the fibre material (85) touches a first part (65) of a wall (61, 65) of the container, at least the first part (65) of the wall consisting of a flexible airtight material (65), wherein the container is adapted to prevent inflow of a polymer into the cavity, and wherein the container (100) further comprises an interchangeable preform (62) such that the fibre material (85) is arranged on the interchangeable preform (62) to shape the fibre material (85) with a desired shape.

11. The container in accordance with claim 10, wherein a static coefficient of friction of the flexible airtight material is 0.2 or lower.

12. The container in accordance with claim 10, wherein the cavity pressure is maintained below a threshold pressure of 800 hPa.

13. The container in accordance with claim 12, wherein the cavity is passively sealed off to maintain the cavity pressure below the threshold pressure.

14. The container in accordance with claim 12, further comprising cavity evacuation means (71, 72) in fluid communication with the cavity and configured to reduce the cavity pressure below the threshold pressure and to maintain the cavity pressure below the threshold pressure.

15. The container in accordance with claim 10, wherein the cavity further comprises a non-cured polymer.

16. The container in accordance with claim 15, wherein a ratio of an entire volume of cured polymer and non-cured polymer in the cavity to the entire volume of the fibre material in the cavity is less than 0.3.

17. The container in accordance with claim 15, wherein a ratio of an entire volume of the non-cured polymer in the cavity to an entire volume of the fibre material in the cavity is less than 0.3.

18. The container in accordance with claim 10, wherein the interchangeable preform (62) in the cavity is a non-planar preform.

19. The container in accordance with claim 10, wherein the flexible airtight material is a vacuum bagging material.

20. A container (100) having a cavity, wherein the cavity has a cavity pressure and comprises fibre material (85) suitable for manufacturing one or more fibre-reinforced composite components for a wind turbine blade, wherein at least a part of the fibre material (85) touches a first part (65) of a wall (61, 65) of the container, at least the first part (65) of the wall comprising a flexible airtight material (65), wherein the container is impermeable to polymer so as to prevent inflow of a polymer into the cavity, and wherein the container (100) further comprises an interchangeable preform (62) such that the fibre material (85) is arranged on the interchangeable preform (62) to shape the fibre material (85) with a desired shape.

* * * * *